United States Patent [19]

Ochs

[11] Patent Number: 4,920,921
[45] Date of Patent: May 1, 1990

[54] MODULAR AQUACULTURE FISH PEN ASSEMBLY WITH SLIDABLE DIVIDER

[76] Inventor: Gordon M. Ochs, 5001 P St., Washougal, Wash. 98671

[21] Appl. No.: 223,910

[22] Filed: Jul. 25, 1988

Related U.S. Application Data

[63] Continuation-in-part of Ser. No. 176,604, Apr. 1, 1988, Pat. No. 4,886,015.

[51] Int. Cl.⁵ ............................................. A01K 63/00
[52] U.S. Cl. ........................................ 119/3; 114/267
[58] Field of Search ............ 119/3; 114/267; 441/45, 441/46; 248/219.4, 231, 231.8

[56] References Cited

U.S. PATENT DOCUMENTS

| | | | |
|---|---|---|---|
| 1,262,731 | 4/1918 | Young | 119/27 |
| 3,446,172 | 5/1969 | Morton et al. | 114/267 |
| 4,487,588 | 12/1984 | Lewis, III et al. | 441/45 X |
| 4,821,988 | 4/1989 | Jimenez | 248/231.8 X |

FOREIGN PATENT DOCUMENTS 2581835 11/1986 France ................................. 119/3

Primary Examiner—Robert P. Swiatek
Attorney, Agent, or Firm—Chernoff, Vilhauer, McClung & Stenzel

[57] ABSTRACT

A modular marine flotation collar for aquaculture applications is disclosed. Component collar segments are sealed by bulkheads including a connecting flange. Standard component collar segments may be assembled into a desired configuration by flange-to-flange connection of adjacent collar segments. A plurality of elongate tubular members having arcuate recesses conforming to the outer perimeters of supporting collar segments are arranged transversely atop the collar assembly so as to provide for the construction of an elevated walkway. The invention provides for a pen divider which is movable within the perimeter of the flotation collar for partitioning an area within the assembly.

12 Claims, 2 Drawing Sheets

MODULAR AQUACULTURE FISH PEN ASSEMBLY WITH SLIDABLE DIVIDER

The present application is a continuation-in-part of U.S. patent application Ser. No. 176,604 filed Apr. 1, 1988, and now Pat. No. 4,886,015.

BACKGROUND OF THE INVENTION

The present invention is directed to a modular flotation support collar having a slidably adjustable pen divider, and to a method for construction thereof using interchangeable component parts. The method and component parts of the present invention are particularly suited for use in the construction of aquaculture fish pens.

Growing consumer awareness in recent years of the health benefits accruing from lower consumption of saturated fats and cholesterol in the diet has resulted in reduced consumption of red meats and increasing demand for seafoods, particularly fish. Traditional harvesting techniques, however, have been unable to meet this growing demand for seafood due in part to limited, and in many cases decreasing, supplies of fish, particularly the more popular species such as salmon. Efforts to economically satisfy this growing demand for seafood have turned to aquaculture thereby nourishing the expansion of the fish farming industry. Fish pens are also used by private organizations and state and federal agencies in fish enhancement programs directed to particular species.

Fish are typically grown in a system of moored or anchored fish pens. The pens are comprised of underwater net cages which permit good water flow through the pens. The upper portions of the net cages are supported by and secured to a buoyant surrounding structure such as a full perimeter floating collar assembly which supports an interconnecting decking structure such as walkways. The walkways, which generally include stanchions for supporting hand railings and net attachments, are used by fish farmers in the course of manual or automatic fish feeding, fish inspection, and storage of supplies, as well as for access to nets in the course of maintenance tasks. Flotation structures having spaced-apart flotation units expose the netting to damage from driftwood or other floating debris. Those structures having metal, styrofoam or wooden component parts are subject to damage from attack by salt water, petrochemical pollution or sea worms. When subjected to wave action, such flotation structures are frequently noisy and subject to excessive wear and reflex movements, all of which are disturbing to the fish and limit the life of the assembly.

Full perimeter floating tubular collars made from single or double floating plastic pipes are becoming increasingly popular, particularly in environments prone to strong winds and significant wave action. Such collars provide substantial floating capacity while their position directly on the water surface offers a minimal profile to wind. The low profile also minimizes reflex movements due to wave action, resulting in a more gentle udulating motion transmitted to the net which, in turn, is less disturbing to the fish and contributes to increased yields. Such collars also act as a trash and log barrier substantially blocking debris from contact with the netting.

In general, tubular support collars for marine applications are assembled from tubular segments filled with flotation material such as polystyrene. The abutting ends of adjoining segments are typically joined by an oversleeve which is welded to one end of a tubular segment and joined by a pin or similar connector to the adjacent tubular segment. Such connections, however, are not waterproof and are subject to infiltration by water which may eventually deteriorate the low density flotation material and reduce the collar buoyancy.

A more serious problem is that the oversleeve must be large enough to readily slip over the tubular segments during assembly of the flotation collar—often in situ under adverse construction conditions. The tolerances required for assembly purposes creates looseness or "slop" in the joint connection. Wave action, working continuously on the loose joint slop may eventually cause the connection to weaken and fail. Collar segments of varying configurations are assembled end-to-end so as to construct a collar assembly of desired size and shape to suit a particular application. The assemblies described above, however, either require the transfer of fish during their growth to progressively larger pens or, in the alternative, require the periodic disconnection and reassembly of the collar assembly to achieve a required size. Such repeated on-site modifications are time consuming, costly and can result in accidental loss of fish.

Finally, aquaculture flotation collar assemblies generally employ double, parallel tubular segments joined along their facing inner perimeters by a plurality of separators which serve as a support for planking or other walkway material. Such a walkway configuration is not only potentially unsafe for users because it is subject to "swamping" from even relatively minimal wave action, but is also subject to damage and fouling from marine contamination thereby requiring more frequent cleaning, repair, and/or replacement.

A need exists for a modular flotation support collar assembly which is sealed from infiltration of water during use and in the course of in-water assembly, and for a method of joining component parts of such an assembly together with a connecting joint that will resist working apart due to wave action. A need also exists for such an assembly having walkways positioned above the reach of normally encountered wave action and for a modular flotation support collar assembly which permits pen enlargement during in-water use so as to accommodate fish growth without the need for costly and time consuming modifications to the collar perimeter.

Summary of the Invention

The present invention is directed to a marine flotation collar particularly suited for aquaculture applications which addresses the forementioned deficiencies of the prior art in a mutually compatible fashion. The invention provides for a watertight closure for sealing the open ends of each collar segment, the closure providing means for achieving a strong wave-resistant watertight joint connection. Collar segments of varying configurations are assembled end-to-end so as to construct a collar assembly of desired size and shape to suit a particular application. The invention provides for a fish pen assembly having a pen divider positioned within the perimeter of the pen so as to partition an area within the assembly. The pen divider includes connector means associated with at least one end of the pen divider for movably engaging the perimeter of the fish pen assembly and selectively adjusting the size of the partitioned area.

In a preferred embodiment of the flotation collar assembly the watertight closures include a plurality of sealed bulkheads each having a peripheral connecting flange and joined by a watertight weld to the respective ends of each one of the collar segments so as to convert the collar segment into a sealed watertight enclosure. The flanged bulkhead closures serve to radially align and transmit torque between adjacent collar segments and to provide for durable interconnection of the collar segments. The connection means used for joining the respective flanges of abutting collar segments is preferably capable of being disengaged without damage to the flanges or to the collar assembly so as to allow for the addition, deletion or realignment of the sealed component collar segments which make up the collar assembly to respond to environmental or production requirements. Such connection means could include, for example, bolts received by respective aligned apertures in adjoining bulkhead flanges.

Located on the top of the collar assembly are a plurality of elongate tubular members arranged transversely and welded to the collar segments, each tubular member formed to have an arcuate recess which conforms to the transverse outer perimeter of the respective collar segment.

The pen divider includes connector means associated with one or more of the pen divider ends so as to enable the end of the pen divider to move longitudinally along one of the perimetrical members of the collar assembly. The connector means preferably include resiliently deformable channel means for receiving and retaining a portion of the pen perimeter within the channel means. The channel means preferably define an inner surface which conforms to the outer surface of the pen perimeter to be engaged. When the fish pen assembly includes opposing and parallel perimetrical members the ends of the pen divider may slidably engage opposing perimetrical members thereby permitting the pen divider to be easily shifted within the pen perimeter to a desired position without disassembly. In such configurations the divider itself is preferably comprised of two or more segments detachably joined so as to allow for engagement of both ends of the divider to the pen perimeter without requiring the disassembly of the perimeter. In one embodiment of the invention the connector means include a tubular sleeve having an outwardly directed longitudinal slot for receiving the pen perimeter.

Accordingly, it is a principal object of the present invention to provide a watertight interconnection between adjoining segments of a marine flotation collar assembly.

It is a further object of the invention to provide sealed and seaworthy connection means between adjacent collar segments.

It is a further object of the present invention to provide individually sealed and seaworthy standard component collar segments which can be used to construct collar assemblies of various configurations.

It is a still further object of the invention to provide for assembly modularity by permitting disengagement and reassembly of adjoining collar segments without damage to the components or infiltration of seawater.

It is yet a further object of the invention to provide for the construction of an elevated walkway assembly alternatively on a single or multiple collar assembly design.

It is a still further object of the present invention to provide a pen divider for partitioning of an area within the perimeter of a marine flotation collar assembly.

It is a further object of the invention to provide a means for connecting a pen divider to an assembled marine flotation collar assembly.

It is a further object of the present invention to provide for a connection means for a pen divider which is adapted to be movable along the perimeter of the collar assembly so as to be used to provide for various configurations for a partitioned area.

It is a still further object of the invention to provide for a pen divider which can be easily and directly installed onto, or removed from an assembled collar perimeter assembly.

It is yet a further object of the invention to provide for a pen divider having connector means for slidably varying the area partitioned by the divider without disassembly of the divider or collar perimeter.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 2:
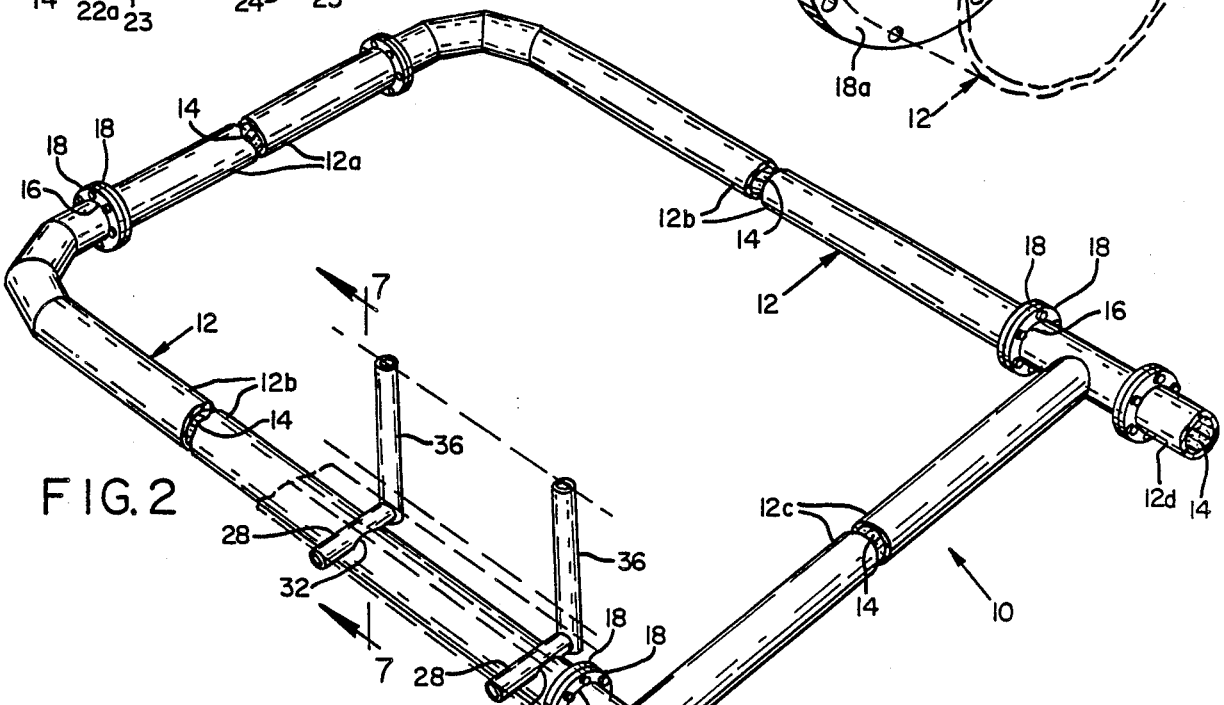
FIG. 2 is a perspective view of an exemplary embodiment of a flotation collar assembly constructed in accordance with the present invention.

Referring to the drawings, a preferred embodiment of the present invention is shown in FIG. 2 as comprising a marine flotation support collar assembly 10 for use in aquaculture fish pens, particularly in fish farming applications. The collar assembly floats at the water surface and serves to secure the upper periphery of an underwater net cage and thereby support the open netting at the water surface. The assembly 10 includes a plurality of elongate tubular segments 12. The segments are of a durable, light-weight plastic construction, such as a high molecular weight, high density polyethylene, which is impervious to water, highly resistant to puncturing and is resistant to fouling from ice, marine life and contamination. Such material can also be easily formed during manufacture to the required segment shapes and sizes.

Figure 3:
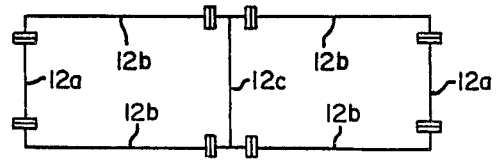
FIG. 3 is a schematic illustration of a first exemplary modular configuration of the collar assembly of FIG. 2.
Figure 4:
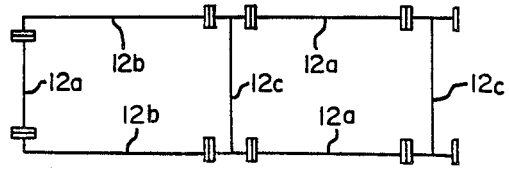
FIG. 4 is a schematic illustration of a second exemplary modular configuration of the collar assembly of FIG. 2.

The example, the substantially rectangular assembly configuration shown in FIG. 2 includes a straight segment 12a, two right-angled segments 12b, and a "double-T" segment 12c. The modularity of the segments, as herein described below, provides sufficient interchangeability to achieve a variety of assembly configurations, two examples of which are schematically illustrated in FIGS. 3 and 4. Generally, the tubular segments 12 are filled with a low density material 14, preferably a plastic such as polystyrene, so as to maintain high buoyancy and to inhibit infiltration of water in the event of damage to the segments 12 or their interconnection.

Figure 5:
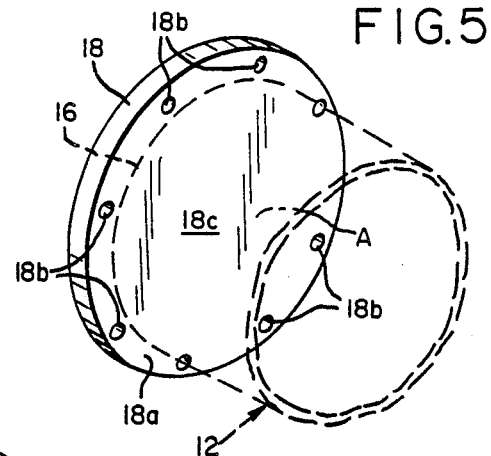
FIG. 5 is a perspective view of a bulkhead for use in accordance with the present invention.

The ends of the tubular segments 12 are individually sealed by a heat or chemical weld to a bulkhead 18. As best seen in FIG. 5, the exemplary bulkheads 18 are circular, planar plates, preferably constructed of polyethylene, and having a diameter greater than that of the tubular segments 12. The intersection of a respective end of a segment 12 with the bulkhead 18 defines a flange 18a along the perimeter of the bulkhead. Each bulkhead 18 is provided with a plurality of apertures 18b positioned around the flange 18a and indexed so as to provide for alignment of the apertures of opposing pairs of bulkheads.

Figure 6:
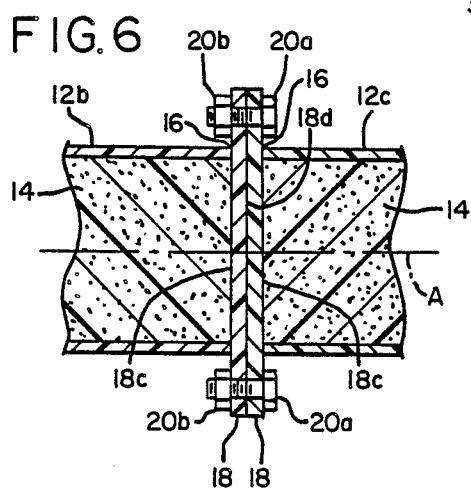
FIG. 6 is a sectional view taken along line 6—6 of FIG. 2.

The ends of the tubular segments 12 have a central axis A and are arranged so that an inner face 18c of a respective bulkhead 18 is transversely intersected by the central axis A. Watertight weld connections 16 individually seal the interior of each tubular segment. When so sealed the segments 12 are assembled as illustrated in FIG. 6 to achieve a collar assembly of desired configuration by selecting adjoining component segments from among prefabricated segment shapes 12a, 12b, 12c and abutting the respective exterior bulkhead plate faces 18d so as to align the apertures 18b. The adjoining segments 12 are connected using a plurality of threaded bolts 12a each of which is received by an aligned pair of apertures 18b and removably secured therein by an opposing, threaded receiving nut 20b. Connection of the segments in this way forms a secure, watertight and torque transmitting junction of adjoining segments and constitutes a substantial improvement over prior art segment connections.

Figure 1:
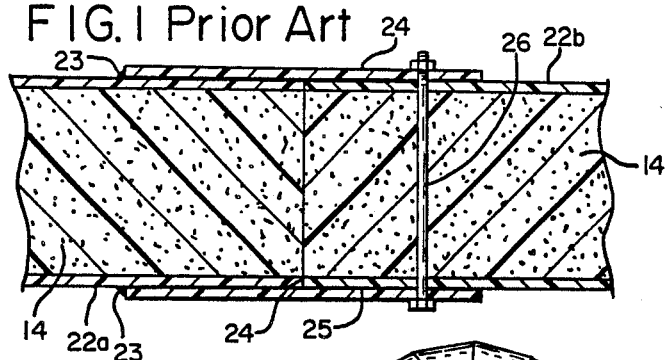
FIG. 1 is a sectional side view of a connection of two flotation collar segments according to the prior art.

Such prior art techniques, as seen, for example, in FIG. 1, secure adjoining segments 22a, 22b by employing a tubular sleeve 24 which fits over adjoining segment ends. Typically, the sleeve 24 would then be heat or chemically welded along the adjoining perimeter 23 to the first segment 22a. The sleeve 24 and second segment 22b are held by a pin 26 secured transversely through the adjoining perimeter 25 of the sleeve and second segment. The inner diameter of the sleeve must be sufficiently greater than the outer diameter of the segment to allow the assembly of the flotation collar on site, often under adverse conditions. The tolerances required for assembly create a loose joint which can be worked by wave action, sometimes causing failure of the joint. Nor are such prior art connections watertight, allowing infiltration of water, particularly along the perimeter 25 and at the external protrusions of pin 26.

Figure 7:
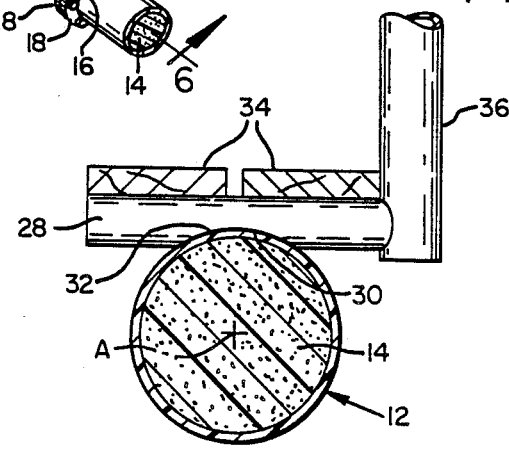
FIG. 7 is a sectional view taken along line 7—7 of FIG. 2.

As shown in FIG. 2, the collar assembly 10 may include a system of elongate tubular members 28 arranged in a horizontal plane transversely atop the segments 12. As best seen in FIG. 7, the members 28 each have a recess 30 formed therein which conforms to the transverse upper perimeter 32 of a respective segment 12. The intersection of the recess 30 and perimeter 32 are securely bonded by a weld. Of course, the members 28 could bridge a plurality of parallel segments 12. The horizontal plane defined by the members 28 support a walkway of wooden planking 34 or other suitable material. A vertical stanchion 36 may be constructed at the respective ends of the members 28 for receiving supports for a hand railing, not shown, and for supporting the upper perimeter of the netting sufficiently above the water surface to prevent the escape of fish from the pen.

It should be understood that the watertight component segments of the collar assembly may be constructed in a manufacturing location and then transported to the "use" site where the component parts are assembled into fish pens of desired configuration. Preferably, the tubular members 28 comprising the walkway support would be affixed to the component segments at the manufacturing location.

Figure 8:
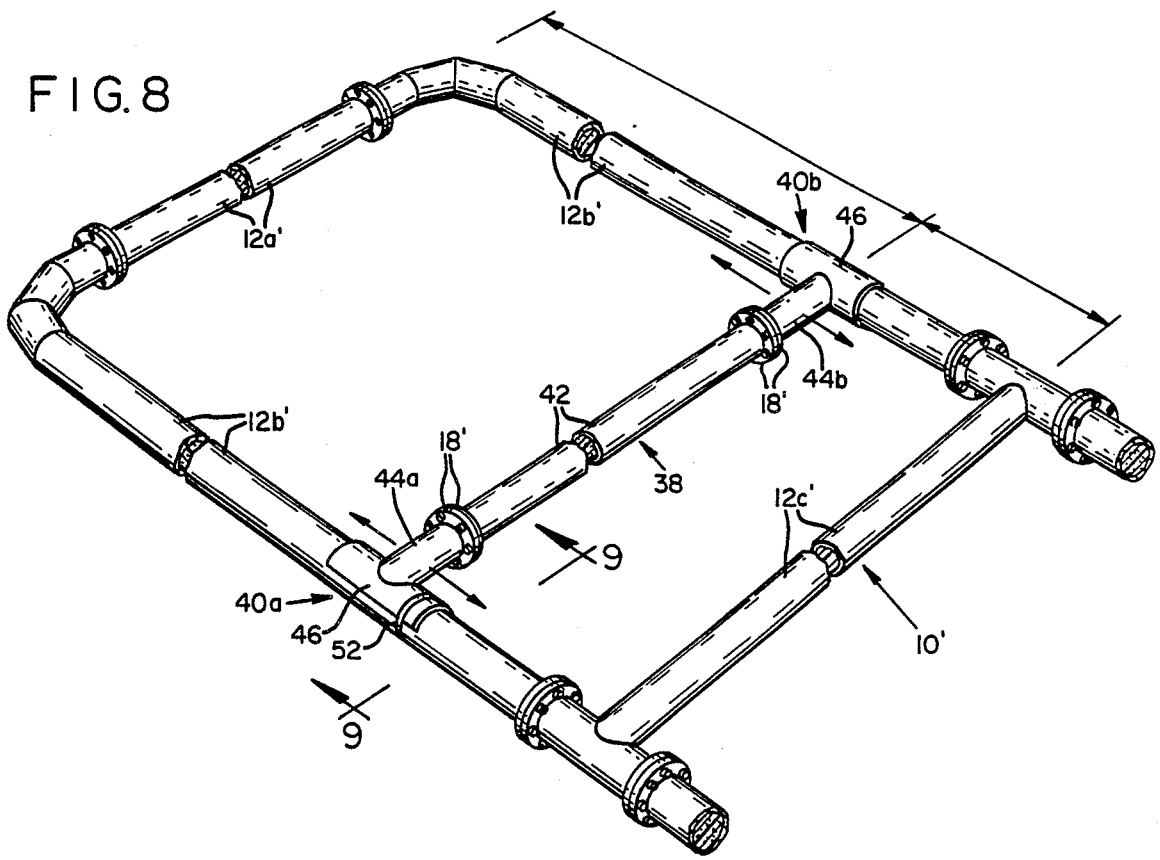
FIG. 8 is a perspective view of a flotation collar assembly having an exemplary pen divider constructed and installed in accordance with the present invention.
Figure 10:
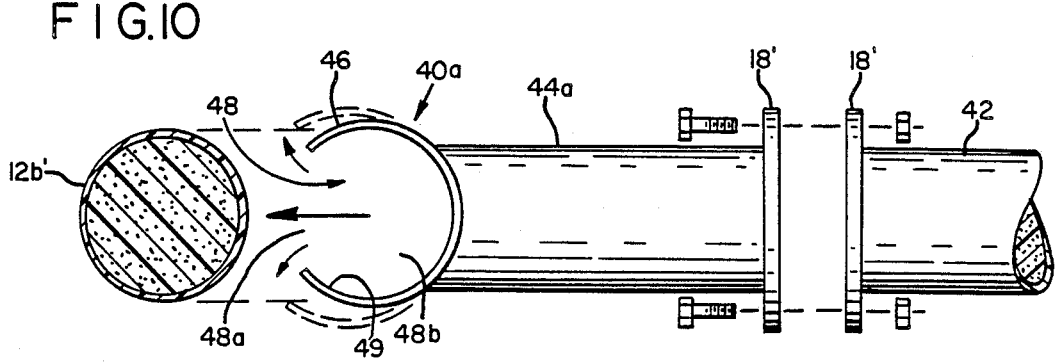
FIG. 10 is the partial sectional view of FIG. 9 illustrating the manner of assembly of the pen divider and installation of one end onto a member of the flotation collar assembly.

FIG. 8 illustrates a marine flotation support collar assembly 10' having elements designated by primed reference numerals where constructed and assembled as previously described with regard to FIG. 2. The collar assembly 10' of FIG. 8 includes an exemplary pen divider 38 having two ends 40a, 40b interconnected by elongate tubular segments 42, 44a, and 44b. The segments preferably are of a durable, lightweight, plastic construction, such as high molecular weight, high density polyethylene. The segments may be filled with a low density material 14', preferably a plastic such as polystyrene, so as to maintain high buoyancy and to inhibit infiltration of water in the event of damage to the segments 42, 44a, 44b or their interconnection. Both ends of segment 42 and the respective inner ends of segments 44a, 44b are individually sealed by a heat or chemical weld to opposing bulkheads 18' as shown in FIG. 5. As seen in FIGS. 8 and 10 the segments 44a, 44b are then joined to a respective end of segment 42 in the manner previously described with regard to FIG. 6. An elongate tubular sleeve 46 is welded to each divider end 40a, 40b so as to cross perpendicular to the central axis of the pen divider at each end of the divider. The sleeve 46 is fabricated of a resilient material and includes an outwardly directed longitudinal slot. Referring to FIG. 10, the sleeve 46 defines a resiliently deformable channel 48 for receiving and retaining a tubular segment 12b' forming a perimetrical member of the collar assembly 10'. The deformable channel 48 includes a restricted mouth 48a formed by the longitudinal slot and a well 48b, defined by the interior of sleeve 46, which substantially corresponds dimensionally to the transverse dimensions of the perimetrical member to be received. The sleeve 46 is preferably fabricated of resilient plastic tubing having a diameter substantially identical to that of segment 12b' so as to obtain an inner surface 49 of the sleeve 46 which is in conforming relation to the outer surface of the tubular segment 12b' to be engaged.

Figure 9:
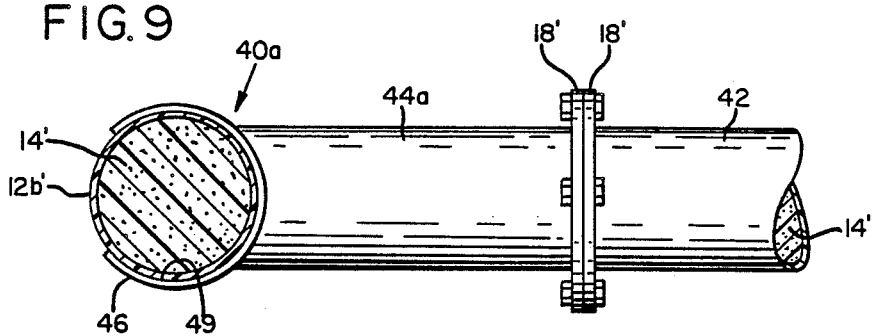
FIG. 9 is a partial sectional view taken along line 9—9 of FIG. 8.

Referring to FIG. 10, the pen divider 38 is installed onto an assembled collar 10' by applying sufficient force to widen the longitudinal slot of resilient sleeve 46 sufficiently to receive and pass segment 12b'. As seen in FIG. 9, a snug engagement between the sleeve and the segment of the collar 10' is achieved when the segment 12b' is received in the sleeve and the force on the slot is released thereby permitting the sleeve to substantially return to its original shape and enabling channel 48 to receive and retain the segment 12b' therein. Once the segment 12b' is received in the sleeve, the narrowness of the slot, the resiliency of the sleeve and the friction between the inner surface of the sleeve and the outer surface of segment 12b' tend to retain the segment 12b' in the sleeve.

Typically, the sleeves associated with the respective ends of the pen divider are engaged to their respective segments of the flotation collar while the divider is disassembled into at least two pen divider segments as shown in FIG. 10. When the pen divider segments are assembled, it will be understood that the outwardly facing slots on the sleeves help to retain the segments 12b' in the respective sleeves since the sleeves are prevented from disengaging movement by the interconnecting tubular segments 42, 44a and 44b. The pen divider thus contributes to the structural integrity of the fish pen assembly by providing an intermediate compression member between opposed perimetrical members. Bands or straps 52 placed around the ends of the sleeves will ensure that the sleeves remain in engagement with the respective segments 12b' and will further add to the structural integrity of the fish pen assembly by enabling the pen divider to also act as a tension member. Once installed, the divider can be slid longitudinally along the opposing collar segments so as to vary the partitioned area within the collar assembly 10'. The divider 38 may be used to secure a portion of the upper periphery of an underwater net cage or to support the upper periphery of an underwater divider within a net cage.

To disassemble the pen divider, the elongate tubular segments are disconnected at a bulkhead flange connection and the short end of the pen divider may be slid along or pivoted about its segment 12b' to enable the respective sleeves 46 to be pulled off or disengaged by their associated segment 12b'.

Although the exemplary embodiment of the pen divider is shown in association with parallel opposed perimetrical numbers, it is also possible to use the sliding comnnectors shown herein with pen dividers of other configurations.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A flotation support collar assembly for an aquaculture fish pen comprising:
   (a) a perimetrical collar including a plurality of elongate members substantially defining a perimeter, said collar defining a plane, said elongate members lying within said plane;
   (b) an elongate pen divider having two ends and a central section interconnecting said ends, said divider lying within said plane and extending between said elongate members so as to partition a portion of said plane which lies within said perimeter;
   (c) said pen divider and said collar including flotation means for supporting said support collar assembly upon the surface of the water; and
   (d) at least one of said ends of said pen divider having connector means, also lying within said plane, for movably engaging one of said elongate members so as to enable said connector means to be moved longitudinally along said elongate member and change said portion of said plane partitioned by said divider.

2. The flotation support collar of claim 1 wherein said connector means each include elongate channel means for receiving and retaining a portion of one of said elongate members within said channel means.

3. The flotation support collar of claim 2 wherein said channel means includes resiliently deformable means for receiving and retaining said portion of said elongate member within said channel means.

4. The flotation support collar of claim 2 wherein said channel means includes a restricted mouth and a well, said well substantially corresponding dimensionally to a transverse dimension of said elongate member.

5. The flotation support collar of claim 2 wherein said channel means includes an elongate tubular sleeve having a longitudinal slot therethrough.

6. The flotation support collar of claim 2 wherein said channel means define an inner surface in conforming relation to an outer surface of said elongate member.

7. The flotation support collar of claim 1 wherein said collar includes parallel opposed elongate members, each of said ends of said divider movably engaging one of said opposed elongate members.

8. The flotation support collar of claim 7 wherein said pen divider defines a central axis perpendicular to said opposed elongate members, said divider including a pair of elongate end portions crossing perpendicular to said central axis at said respective ends of said divider and lying within said plane, said end portions respectively including resiliently deformable channel means for receiving and retaining a respective one of said opposed elongate members within said channel means.

9. The flotation support collar of claim 8 wherein said channel means respectively include an elongate tubular sleeve attached to said divider, said sleeve having an outwardly directed longitudinal slot therein.

10. The flotation support collar of claim 1 wherein said divider includes at least one operable assembly means intermediate said ends for disassembling said divider into segments.

11. The support collar assembly of claim 1 wherein two of said elongate members are in opposed relation, said pen divider serving as compression member means for preventing said opposed elongate members from moving toward each other along an axis defined by said pen divider.

12. The support collar of claim 11 wherein said connector means includes operable attachment means for selectively preventing said connector means from detaching from said elongate member, said pen divider serving as tension member means for preventing said opposed elongate members from moving apart from each other along said axis defined by said pen divider.

* * * * *

UNITED STATES PATENT AND TRADEMARK OFFICE
CERTIFICATE OF CORRECTION

PATENT NO.   :   4,920,921
DATED        :   May 1, 1990
INVENTOR(S)  :   Gordon M. Ochs It is certified that error appears in the above-identified patent and that said Letters Patent is hereby corrected as shown below:

Col. 1,   Line 62:   Change "udulating" to --undulating--.
Col. 2,   Line 53    Change "forementioned" to --aforementioned--.
Col. 7,   Line 40    Change "comnectors" to --connectors--.

Signed and Sealed this

First Day of December, 1992

*Attest:*

DOUGLAS B. COMER

*Attesting Officer*     *Acting Commissioner of Patents and Trademarks*